(12) United States Patent
Heron

(10) Patent No.: US 6,220,585 B1
(45) Date of Patent: Apr. 24, 2001

(54) MULTI-STAGE COMPRESSION SPRING

(75) Inventor: Arnold J. Heron, Ajax (CA)

(73) Assignee: Timbren Industries Incorporated, Ajax (CA)

(*) Notice: Subject to any disclaimer, the term of this patent is extended or adjusted under 35 U.S.C. 154(b) by 0 days.

(21) Appl. No.: 09/182,731

(22) Filed: Oct. 29, 1998

(51) Int. Cl.[7] .................................................... F16F 1/36
(52) U.S. Cl. ............................................. 267/153; 267/152
(58) Field of Search ............................. 267/35, 152, 153, 267/141.1, 292

(56) References Cited

U.S. PATENT DOCUMENTS

| | | |
|---|---|---|
| D. 374,483 | 10/1996 | Lopez et al. . |
| 2,711,315 | 6/1955 | Mosebach . |
| 2,926,011 | 2/1960 | Slemmons et al. . |
| 2,933,308 | 4/1960 | McGavern, Jr. et al. . |
| 3,160,407 | 12/1964 | Vaugoyeau . |
| 3,263,985 | 8/1966 | Planta . |
| 3,315,951 * | 4/1967 | Boschi et al. ........................ 267/152 |
| 3,409,284 * | 11/1968 | Rix ....................................... 267/152 |
| 3,713,665 | 1/1973 | Gouirand . |
| 4,029,305 | 6/1977 | Schubert et al. . |
| 4,424,961 | 1/1984 | Takei . |
| 4,493,481 | 1/1985 | Merkle . |
| 4,560,150 | 12/1985 | Shtarkman . |
| 4,650,166 | 3/1987 | Warmuth . |
| 4,783,096 | 11/1988 | Ramsey et al. . |
| 4,807,858 | 2/1989 | Watanabe et al. . |
| 5,280,890 * | 1/1994 | Wydra ................................... 267/220 |
| 5,460,357 * | 10/1995 | Stewart ................................. 267/294 |
| 5,588,665 | 12/1996 | Pierce et al. . |
| 5,791,637 | 8/1998 | Reichelt et al. . |

* cited by examiner

Primary Examiner—Robert J. Oberleitner
Assistant Examiner—Pamela J. Rodriguez

(57) ABSTRACT

A multi-stage resiliently compressible element for providing a biasing element having at least two portions having different compression resistances from one another. The multi-stage resiliently compressible element includes a resiliently compressible element comprising a resiliently deformable elastomeric material and having top and bottom faces and a side surface. The side surface of the resiliently compressible element has an annular channel therearound which divides the resiliently compressible element into top and bottom portions. The resiliently compressible element has a bore therethrough extending between the top and bottom faces. The bore has generally cylindrical top and bottom regions and top and bottom chambers interposed between the top and bottom regions of the bore. The top and bottom portions of the resiliently compressible element each have a compression resistance for resisting compression against the top and bottom faces of the resiliently compressible element in directions generally parallel to the axis of the resiliently compressible element. The resistance of the top portion is less than the compression resistance of the bottom portion so that the top portion is relatively softer than the bottom portion.

21 Claims, 1 Drawing Sheet

MULTI-STAGE COMPRESSION SPRING

BACKGROUND OF THE INVENTION

1. Field of the Invention

The present invention relates to compression springs and more particularly pertains to a new multi-stage compression spring for providing a biasing element having at least two portions having different compression resistances from one another.

2. Description of the Prior Art

The use of compression springs is known in the prior art. More specifically, compression springs heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,560,150; U.S. Pat. No. 5,588,665; U.S. Pat. No. 3,713,665; U.S. Pat. No. 4,029,305; U.S. Pat. No. 4,650,166; U.S. Pat. No. 2,933,308; U.S. Pat. No. 4,783,096; U.S. Pat. No. 3,160,407; U.S. Pat. No. 4,807,858; U.S. Pat. No. 2,926,011; U.S. Pat. No. 4,493,481; U.S. Pat. No. 3,263,985; U.S. Pat. No. 5,791,637; U.S. Pat. No. 2,711,315; and U.S. Pat. No. 4,242,961.

SUMMARY OF THE INVENTION

In view of the foregoing disadvantages inherent in the known types of compression springs now present in the prior art, the present invention provides a new multi-stage compression spring construction wherein the same can be utilized for providing a biasing element having at least two portions having different compression resistances from one another.

The general purpose of the present invention, which will be described subsequently in greater detail, is to provide a new multi-stage compression spring apparatus and method which has many of the advantages of the compression springs mentioned heretofore and many novel features that result in a new multi-stage compression spring which is not anticipated, rendered obvious, suggested, or even implied by any of the prior art compression springs, either alone or in any combination thereof.

To attain this, the present invention generally comprises a resiliently compressible element comprising a resiliently deformable elastomeric material and having top and bottom faces and a side surface. The side surface of the resiliently compressible element has an annular channel therearound which divides the resiliently compressible element into top and bottom portions. The resiliently compressible element has a bore therethrough extending between the top and bottom faces. The bore has generally cylindrical top and bottom regions and top and bottom chambers interposed between the top and bottom regions of the bore. The top and bottom chambers of the bore each have generally frusto-conical upper and lower sections. The upper and lower sections of the top chamber form an annular upper intersection therebetween. The upper and lower sections of the bottom chamber form an annular lower intersection therebetween. The lower section of the top chamber and the upper section of the bottom chamber form an annular middle intersection therebetween. The diameter of the upper intersection is greater than the diameter of the lower intersection which is greater than the diameter of the middle intersection. The top and bottom portions of the resiliently compressible element each have a compression resistance for resisting compression against the top and bottom faces of the resiliently compressible element in directions generally parallel to the axis of the resiliently compressible element. The resistance of the top portion is less than the compression resistance of the bottom portion so that the top portion is relatively softer than the bottom portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new multi-stage compression spring apparatus and method which has many of the advantages of the compression springs mentioned heretofore and many novel features that result in a new multi-stage compression spring which is not anticipated, rendered obvious, suggested, or even implied by any of the prior art compression springs, either alone or in any combination thereof.

It is another object of the present invention to provide a new multi-stage compression spring which may be easily and efficiently manufactured and marketed.

It is a further object of the present invention to provide a new multi-stage compression spring which is of a durable and reliable construction.

An even further object of the present invention is to provide a new multi-stage compression spring which is susceptible of a low cost of manufacture with regard to both materials and labor, and which accordingly is then susceptible of low prices of sale to the consuming public, thereby making such multi-stage compression spring economically available to the buying public.

Still yet another object of the present invention is to provide a new multi-stage compression spring which provides in the apparatuses and methods of the prior art some of the advantages thereof, while simultaneously overcoming some of the disadvantages normally associated therewith.

Still another object of the present invention is to provide a new multi-stage compression spring for providing a biasing element having at least two portions having different compression resistances from one another.

Yet another object of the present invention is to provide a new multi-stage compression spring which includes a resiliently compressible element comprising a resiliently deformable elastomeric material and having top and bottom faces and a side surface. The side surface of the resiliently compressible element has an annular channel therearound which divides the resiliently compressible element into top and bottom portions. The resiliently compressible element has a bore therethrough extending between the top and bottom faces. The bore has generally cylindrical top and bottom regions and top and bottom chambers interposed between the top and bottom regions of the bore. The top and bottom chambers of the bore each have generally frusto-conical upper and lower sections. The upper and lower sections of the top chamber form an annular upper intersection therebetween. The upper and lower sections of the bottom chamber form an annular lower intersection therebetween. The lower section of the top chamber and the upper section of the bottom chamber form an annular middle intersection therebetween. The diameter of the upper intersection is greater than the diameter of the lower intersection which is greater than the diameter of the middle intersection. The top and bottom portions of the resiliently compressible element each have a compression resistance for resisting compression against the top and bottom faces of the resiliently compressible element in directions generally parallel to the axis of the resiliently compressible element. The resistance of the top portion is less than the compression resistance of the bottom portion so that the top portion is relatively softer than the bottom portion.

Even yet still another object of the present invention is to provide a new multi-stage compression spring that may be effectively used in applications where the top and bottom faces of the resiliently compressible element lie in planes that are not substantially perpendicular to the axis of the resiliently compressible element. In such cases, the compression forces on the resiliently compressible element are applied in directions not substantially parallel to the axis of the resiliently compressible element. However, unlike traditional coiled compression springs, the multi-stage compression spring is able to compress without forming damaging kinks in the side of the resilient compressible element from forces applied at acute angles to the axis of the resiliently compressible element greater than would be tolerated by a traditional coiled compression spring.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
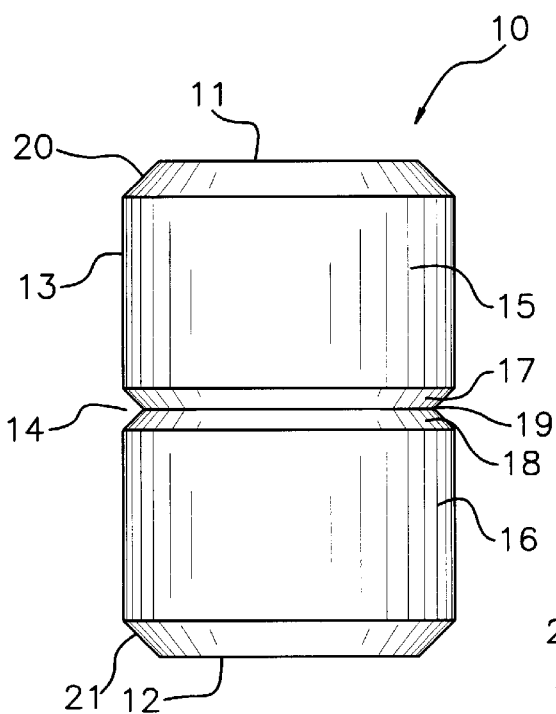
FIG. 1 is a schematic side view of a new multi-stage compression spring according to the present invention.
Figure 2:
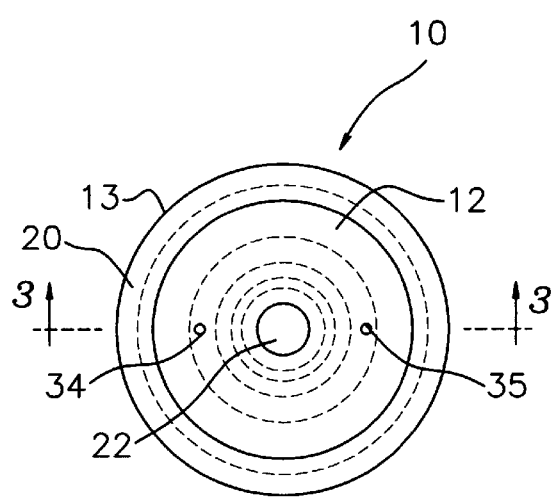
FIG. 2 is a schematic top view of the present invention.
Figure 3:
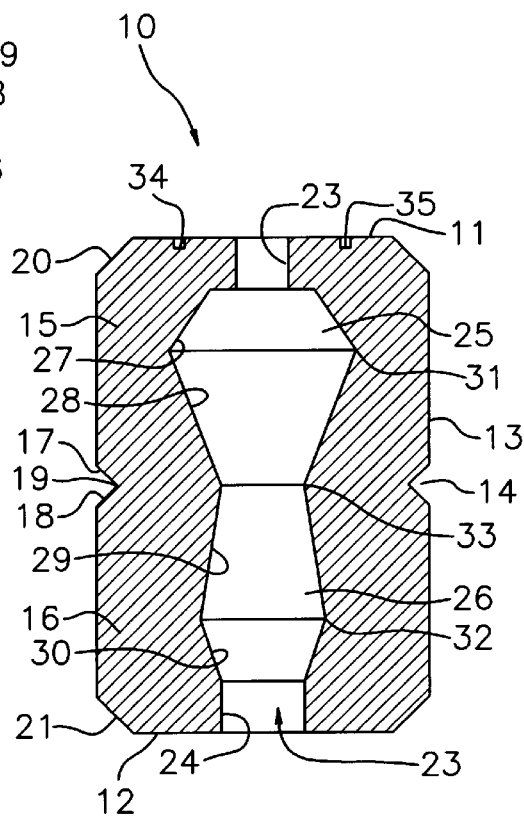
FIG. 3 is a schematic cross sectional view of the present invention taken from line 3—3 of FIG. 2.

With reference now to the drawings, and in particular to FIGS. 1 through 3 thereof, a new multi-stage compression spring embodying the principles and concepts of the present invention will be described.

As best illustrated in FIGS. 1 through 3, the multi-stage compression spring generally comprises a resiliently compressible element 10 comprising a resiliently deformable elastomeric material and having top and bottom faces 11,12, and a side surface 13. The side surface 13 of the resiliently compressible element has an annular channel 14 therearound which divides the resiliently compressible element 10 into top and bottom portions 15,16. The resiliently compressible element 10 has a bore 22 therethrough extending between the top and bottom faces 11,12. The bore 22 has generally cylindrical top and bottom regions 23,24 and top and bottom chambers 25,26 interposed between the top and bottom regions 23,24 of the bore. The top and bottom chambers 25,26 of the bore each have generally frusto-conical upper and lower sections 27,29,28,30. The upper and lower sections 27,28 of the top chamber form an annular upper intersection 31 therebetween. The upper and lower sections 29,30 of the bottom chamber form an annular lower intersection 32 therebetween. The lower section 28 of the top chamber and the upper section 29 of the bottom chamber form an annular middle intersection 33 therebetween. The diameter of the upper intersection is greater than the diameter of the lower intersection which is greater than the diameter of the middle intersection. The top and bottom portions of the resiliently compressible element each have a compression resistance for resisting compression against the top and bottom faces of the resiliently compressible element in directions generally parallel to the axis of the resiliently compressible element. The resistance of the top portion is less than the compression resistance of the bottom portion so that the top portion is relatively softer than the bottom portion.

In closer detail, the multi-stage compression spring comprises a generally cylindrical resiliently compressible element 10 having generally circular top and bottom faces 11,12, a generally cylindrical side surface 13, and an axis extending between the top and bottom faces 11,12 of the resiliently compressible element. IT should be noted that top and bottom are used here for clarity purposes and that the compression spring can be inverted in use so that the top and bottom of the compression spring are inverted. The resiliently compressible elements comprises a resiliently deformable elastomeric material such as a resiliently elastic rubber material. Preferably, the top and bottom faces 11,12 of the resiliently compressible element lie in generally parallel planes to one another generally perpendicular to the axis of the resiliently compressible element. In use, the resiliently compressible element 10 is designed for compression against the top and bottom faces in a direction generally parallel to the axis of the resiliently compressible element to provide a contrary biasing force to the forces parallel to the axis.

As illustrated in FIGS. 1 and 3, the side surface 13 of the resiliently compressible element has an annular channel 14 therearound. The annular channel 14 of the resiliently compressible element divides the resiliently compressible element 10 into generally cylindrical top and bottom portions 15,16. The top portion 15 of the resiliently compressible element is defined between the top face 11 and the annular channel 14 of the resiliently compressible element. The bottom portion 16 of the resiliently compressible element 10 is defined between the bottom face 12 and the annular channel 14 of the resiliently compressible element. Preferably, the annular channel 14 of the resiliently compressible element generally lies in a plane substantially perpendicular to the axis of the resiliently compressible element 10. Preferably, the annular channel 14 is positioned on the side wall of the resiliently compressible element 10 generally equidistant between top and bottom faces 11,12 of the resiliently compressible element.

The annular channel 14 preferably has a generally V-shaped transverse cross section taken from a vertical plane in which the axis of the resiliently compressible element 10 lies. As illustrated in FIG. 3, the transverse cross section of the annular channel 14 has top and bottom sides 17,18 converging together at an inner vertex 19. The top and bottom sides 17,18 of the transverse cross section of the annular channel 14 each are extended at an acute angle from a horizontal plane substantially perpendicular to the axis of the resiliently compressible element 10 in which the inner vertex 19 lies. Preferably, the acute angles of the top and bottom sides 17,18 of the transverse cross section of the annular channel 14 are about equal to one another. Ideally, the acute angles of the top and bottom sides 17,18 of the transverse cross section of the annular channel 14 are each about 45 degrees.

In the preferred embodiment, the resiliently compressible element 10 has an annular top beveled edge 20 around the top face 11 of the resiliently compressible element and an annular bottom edge around the bottom face 12 of the resiliently compressible element. The top beveled edge 20 of the resiliently compressible element 10 is preferably extended at an acute angle from the top face 11 of the resiliently compressible element and the bottom beveled edge 21 of the resiliently compressible element 10 is preferably extended at an acute angle from the bottom face 12 of the resiliently compressible element. Even more preferably, the acute angles of the top and bottom beveled edges 20,21 of the resiliently compressible element are about equal to one another. Ideally, the acute angles of the top and bottom beveled edges 20,21 of the resiliently compressible element are each about 45 degrees.

The resiliently compressible element 10 has a length defined between the top and bottom faces 11,12 of the resiliently compressible element. In an ideal illustrative embodiment, the length of the resiliently compressible element 10 is about 9½ inches.

The top and bottom faces 11,12 of the resiliently compressible element each have a diameter. The diameters of the top and bottom faces 11,12 of the resiliently compressible element each are preferably about equal to one another. In the ideal illustrative embodiment, the diameters of the top and bottom faces 11,12 of the resiliently compressible element are each about 5 inches. The top and bottom portions 15,16 of the resiliently compressible element each have a diameter which are preferably about equal to one another. In the ideal illustrative embodiment, the diameters of the top and bottom portions 15,16 of the resiliently compressible element are each about 6½ inches.

The resiliently compressible element 10 has a bore 22 therethrough extending between the top and bottom faces 11,12 of the resiliently compressible element. The bore 22 of the resiliently compressible element has a longitudinal axis preferably coaxial with the axis of the resiliently compressible element 10. The bore 22 has generally cylindrical top and bottom regions 23,24 and top and bottom chambers 25,26 interposed between the top and bottom regions 23,24 of the bore. The top region of the bore 22 is positioned adjacent the top face 11 of the resiliently compressible element. The bottom region 24 of the bore 22 is positioned adjacent the bottom face 12 of the resiliently compressible element. The top chamber 25 of the bore is positioned adjacent the bottom chamber 26 of the bore. The top chamber 25 of the bore is located in the top portion 15 of the resiliently compressible element and the bottom chamber 26 of the bore is located in the bottom portion 16 of the resiliently compressible element 10.

The top and bottom portions 15,16 of the resiliently compressible element 10 each have a compression resistance for resisting compression on the top and bottom faces in a direction generally parallel to the axis of the resiliently compressible element. The compression resistances of the top and bottom portions may be varied to suit a variety of applications for the multi-stage compression spring by changing the size and configuration of the top and bottom chambers of the bore. Preferably, the size and configuration of the top and bottom chambers of the bore of the resiliently compressible element causes the compression resistance of the top portion 15 to be less than the compression resistance of the bottom portion 16 such that the bottom portion 16 of the resiliently compressible element 10 is stiffer than the upper portion of the resiliently compressible element 10. Ideally, the compression resistance of the bottom portion 16 is between about 10 percent and about 80 percent of the compression resistance of the top portion 15.

In even closer detail, the top and bottom regions 23,24 of the bore each have a length defined along the longitudinal axis of the bore 22 and a diameter defined substantially perpendicular to the longitudinal axis of the bore 22. Preferably, the length of the top region of the bore 22 is greater than the length of the bottom region 24 of the bore 22. In the ideal illustrative embodiment, the length of the top region of the bore 22 is about 1.054 inches and the length of the bottom region 24 of the bore 22 is about 1 inch. The diameter of the bottom region 24 of the bore 22 is also preferably greater than the diameter of the top region of the bore 22. In the ideal illustrative embodiment, the diameter of the bottom region 24 of the bore 22 is about 1.25 inches and the diameter of the top region of the bore 22 is about 1.188 inches.

The top and bottom chambers 25,26 of the bore each have generally frusto-conical upper and lower sections 27,29,28, 30. The upper sections 27,29 of the top and bottom chambers each taper towards the top face 11 of the resiliently compressible element. The lower sections 28,30 of the top and bottom chambers each taper towards the bottom face 12 of the resiliently compressible element. The upper section 27 of the top chamber is positioned adjacent the top region of the bore 22. The lower section 30 of the bottom chamber is positioned adjacent the bottom region 24 of the bore 22.

The upper and lower sections 27,28 of the top chamber form an annular upper intersection 31 therebetween. The upper and lower sections 29,30 of the bottom chamber form an annular lower intersection 32 therebetween. The lower section 28 of the top chamber and the upper section 29 of the bottom chamber form an annular middle intersection 33 therebetween. The upper, lower, and middle intersections 31,32,33 of the bore preferably lie in substantially parallel planes extending substantially perpendicular to the longitudinal axis of the bore 22.

The upper, lower, and middle intersections 31,32,33 of the bore 22 each have a diameter defined substantially perpendicular to the longitudinal axis of the bore 22. Preferably, the diameter of the upper intersection 31 is greater than the diameter of the lower intersection 32, and the diameter of the lower intersection 32 is greater than the diameter of the middle intersection 33. In the ideal illustrative embodiment, the diameter of the upper intersection 31 is about 3½ inches, the diameter of the lower intersection 32 is about 2½ inches, and the diameter of the middle intersection 33 is about 1¾ inches.

The upper and lower sections of the top and bottom chambers each have a length defined along the longitudinal axis of the bore. The length of the upper section 27 of the top chamber is defined between the top region of the bore 22 and the lower section 28 of the top chamber. The length of the lower section 28 of the top chamber is defined between the upper section 27 of the top chamber and the top section of the bottom chamber 26. The length of the upper section 29 of the bottom chamber is defined between the lower section 28 of the top chamber and the lower section 30 of the bottom chamber. The length of the lower section 30 of the bottom chamber is defined between the bottom region 24 of the bore 22 and the upper section 29 of the bottom chamber.

In a preferred embodiment, the length of the lower section 28 of the top chamber is greater than the length of the upper section 27 of the top chamber and the length of the upper section 29 of the bottom chamber is greater than the length of the lower section 30 of the bottom chamber. Even more preferably, the length of the lower section 30 of the bottom chamber is greater than the upper section 27 of the top chamber. This sizing of the lengths of the sections of the top and bottom chambers helps to make the compression resistance of the top portion less than the compression resistance of the bottom portion.

In an ideal embodiment, the lengths of the lower section 28 of the top chamber and the upper section 29 of the bottom chamber are about equal to one another. Additionally, the length of the upper section 27 of the top chamber is greater than both the length of the top region of the bore 22 and the length of the bottom region 24 of the bore 22. Also, in this ideal embodiment, the length of the lower section 28 of the top chamber should greater than the length of the bottom region 24 of the bore 22.

In an ideal illustrative embodiment, the length of the upper section 27 of the top chamber is about 1.3 inches, the length of the lower section 28 of the top chamber is about 2.375 inches, the length of the upper section 29 of the bottom chamber is about 2.375 inches, and the length of the lower section 30 of the bottom chamber is about 1.375 inches. The upper and lower sections of the top and bottom chambers 25,26 each has a slope extending at an acute angle with respect to a corresponding plane extending substantially perpendicular to the longitudinal axis of the bore 22. In a preferred embodiment, the acute angle of the lower section 28 of the top chamber should be greater than the acute angle of the upper section 27 of the top chamber. Conversely, in this preferred embodiment, the acute angle of the upper section 29 of the bottom chamber is greater than the acute angle of the lower section 30 of the bottom chamber. In this preferred embodiment, it is even more preferable that the acute angle of the upper section 29 of the bottom chamber and the acute angle of the lower section 30 of the bottom chamber both be greater than the acute angle of the lower section 28 of the top chamber.

In the ideal illustrative embodiment, the acute angle of the upper section 27 of the top chamber is about 60 degrees and the acute angle of the lower section 28 of the top chamber is about 70 degrees. Additionally, the acute angle of the upper section 29 of the bottom chamber is about 80 degrees and the acute angle of the lower section 30 of the bottom chamber is about 75 degrees in the ideally illustrative embodiment.

In use, forces applied to the resiliently compressible element on the top and bottom faces in directions extending generally parallel to the axis of the resiliently compressible element initially primarily compress the top portion 15 more than the bottom portion 16 because of the lesser compression resistance of the top portion 15. The greater the forces applied to the top and bottom faces, the more the bottom portion 16 is compressed. This allows the resiliently compressible element to function as a two-stage compression spring where the forces less than a predetermined amount applied to the top and bottom faces in directions generally parallel to the axis of the resiliently compressible element primarily compress the top portion while forces greater than the predetermined amount increasingly compress the bottom portion to a greater degree.

Optionally, the top face 11 of the resiliently compressible element may have a pair of holes 34,35 therein. The top region 23 of the bore 22 of the resiliently compressible element is interposed between the holes of the top face 11 of the resiliently compressible element ideally with the holes in diametric positions on either side of the bore. In use, the holes of the top face may be used to extend studs therein to help hold the top face of the resiliently compressible element to a structure above the top face.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A multi-stage compression spring, comprising:
    a resiliently compressible element having top and bottom faces, a side surface, and an axis extending between said top and bottom faces of said resiliently compressible element;
    said side surface of said resiliently compressible element having an annular channel therearound, said annular channel of said resiliently compressible element dividing said resiliently compressible element into top and bottom portions;
    said resiliently compressible element having a bore therethrough extending between said top and bottom faces of said resiliently compressible element, said bore of said resiliently compressible element having a longitudinal axis;

said bore having generally cylindrical top and bottom regions and top and bottom chambers interposed between said top and bottom regions of said bore;

said top and bottom regions of said bore each having a diameter;

said top and bottom chambers of said bore each having generally frusto-conical upper and lower sections, said upper sections of said top and bottom chambers each tapering towards said top face of said resiliently compressible element, said lower sections of said top and bottom chambers each tapering towards said bottom face of said resiliently compressible element;

said upper and lower sections of said top chamber forming an annular upper intersection therebetween;

said upper and lower sections of said bottom chamber forming an annular lower intersection therebetween;

said lower section of said top chamber and said upper section of said bottom chamber forming an annular middle intersection therebetween;

said upper, lower, and middle intersections of said bore each having a diameter defined substantially perpendicular to said longitudinal axis of said bore;

said diameter of said upper intersection being greater than said diameter of said lower intersection, said diameter of said lower intersection being greater than said diameter of said middle intersection;

said top and bottom portions of said resiliently compressible element each having a compression resistance for resisting compression against said top and bottom faces of said resiliently compressible element in directions generally parallel to said axis of said resiliently compressible element, said compression resistance of said top portion being less than said compression resistance of said bottom portion; and wherein said upper and lower sections of said top and bottom chambers each have a length defined along said longitudinal axis of said bore, said length of said lower section of said top chamber being greater than said length of said upper section of said top chamber, said length of said upper section of said bottom chamber being greater than said length of said lower section of said bottom chamber, and said length of said lower section of said bottom chamber being greater than said upper section of said top chamber.

2. The multi-stage compression spring of claim 1, wherein said resiliently compressible element is generally cylindrical, said top and bottom faces are generally circular, and said side surface is generally cylindrical.

3. The multi-stage compression spring of claim 1, wherein said top and bottom faces of said resiliently compressible element lie in generally parallel planes to one another.

4. The multi-stage compression spring of claim 1, wherein said annular channel of said resiliently compressible element generally lies in a plane substantially perpendicular to said axis of said resiliently compressible element.

5. The multi-stage compression spring of claim 4, wherein said annular channel is positioned on said side wall of said resiliently compressible element generally equidistant between top and bottom faces of said resiliently compressible element.

6. The multi-stage compression spring of claim 1, wherein said annular channel has a generally V-shaped transverse cross section, said transverse cross section of said annular channel having top and bottom sides converging together at an inner vertex.

7. The multi-stage compression spring of claim 6, wherein said top and bottom sides of said transverse cross section of said annular channel each are extended at an acute angle from a plane substantially perpendicular to said axis of said resiliently compressible element in which said inner vertex lies.

8. The multi-stage compression spring of claim 7, wherein said acute angles of said top and bottom sides of said transverse cross section of said annular channel are about equal to one another.

9. The multi-stage compression spring of claim 7, wherein said acute angles of said top and bottom sides of said transverse cross section of said annular channel are each about 45 degrees.

10. The multi-stage compression spring of claim 1, wherein said resiliently compressible element has an annular top beveled edge around said top face of said resiliently compressible element, and wherein said resiliently compressible element has an annular bottom beveled edge around said bottom face of said resiliently compressible element.

11. The multi-stage compression spring of claim 10, wherein said top beveled edge of said resiliently compressible element is extended at an acute angle from said top face of said resiliently compressible element, and wherein said bottom beveled edge of said resiliently compressible element is extended at an acute angle from said bottom face of said resiliently compressible element.

12. The multi-stage compression spring of claim 11, wherein said acute angles of said top and bottom beveled edges of said resiliently compressible element are about equal to one another.

13. The multi-stage compression spring of claim 11, wherein said acute angles of said top and bottom beveled edges of said resiliently compressible element are each about 45 degrees.

14. The multi-stage compression spring of claim 1, wherein said top and bottom regions of said bore each have a length defined along said longitudinal axis of said bore and a diameter defined substantially perpendicular to said longitudinal axis of said bore, said length of said top region of said bore being greater than said length of said bottom region of said bore.

15. The multi-stage compression spring of claim 1, wherein said diameter of said bottom region of said bore is greater than said diameter of said top region of said bore.

16. The multi-stage compression spring of claim 1, wherein said lengths of said lower section of said top chamber and said upper section of said bottom chamber are about equal to one another.

17. A multi-stage compression spring, comprising:

a resiliently compressible element comprising a resiliently deformable elastomeric material, said resiliently compressible element being generally cylindrical and having generally circular top and bottom faces, a generally cylindrical side surface, and an axis extending between said top and bottom faces of said resiliently compressible element;

said top and bottom faces of said resiliently compressible element lying in generally parallel planes to one another;

said side surface of said resiliently compressible element having an annular channel therearound, said annular channel of said resiliently compressible element dividing said resiliently compressible element into top and bottom portions, said top portion of said resiliently compressible element being defined between said top face and said annular channel of said resiliently compressible element, said bottom portion of said resiliently compressible element being defined between said bottom face and said annular channel of said resiliently compressible element;

said annular channel of said resiliently compressible element generally lying in a plane substantially perpendicular to said axis of said resiliently compressible element;

said annular channel being positioned on said side wall of said resiliently compressible element generally equidistant between top and bottom faces of said resiliently compressible element;

said annular channel having a generally V-shaped transverse cross section, said transverse cross section of said annular channel having top and bottom sides converging together at an inner vertex, said top and bottom sides of said transverse cross section of said annular channel each being extended at an acute angle from a plane substantially perpendicular to said axis of said resiliently compressible element in which said inner vertex lies;

wherein said acute angles of said top and bottom sides of said transverse cross section of said annular channel are about equal to one another;

wherein said acute angles of said top and bottom sides of said transverse cross section of said annular channel are each about 45 degrees;

said resiliently compressible element having an annular top beveled edge around said top face of said resiliently compressible element, said resiliently compressible element having an annular bottom beveled edge around said bottom face of said resiliently compressible element;

said top beveled edge of said resiliently compressible element being extended at an acute angle from said top face of said resiliently compressible element, said bottom beveled edge of said resiliently compressible element being extended at an acute angle from said bottom face of said resiliently compressible element;

wherein said acute angles of said top and bottom beveled edges of said resiliently compressible element are about equal to one another, wherein said acute angles of said top and bottom beveled edges of said resiliently compressible element are each about 45 degrees;

said resiliently compressible element having a length defined between said top and bottom faces of said resiliently compressible element;

said top and bottom faces of said resiliently compressible element each having a diameter, said diameters of said top and bottom faces of said resiliently compressible element each being about equal to one another;

said top and bottom portions of said resiliently compressible element each having a diameter, said diameters of said top and bottom portions of said resiliently compressible element each being about equal to one another;

said resiliently compressible element having a bore therethrough extending between said top and bottom faces of said resiliently compressible element, said bore of said resiliently compressible element having a longitudinal axis coaxial with said axis of said resiliently compressible element;

said bore having generally cylindrical top and bottom regions and top and bottom chambers interposed between said top and bottom regions of said bore;

said top region of said bore being positioned adjacent said top face of said resiliently compressible element, said bottom region of said bore being positioned adjacent said bottom face of said resiliently compressible element;

said top chamber of said bore being positioned adjacent said bottom chamber of said bore, said top chamber of said bore being located in said top portion of said resiliently compressible element, said bottom chamber of said bore being located in said bottom portion of said resiliently compressible element;

said top and bottom regions of said bore each having a length defined along said longitudinal axis of said bore and a diameter defined substantially perpendicular to said longitudinal axis of said bore;

said length of said top region of said bore being greater than said length of said bottom region of said bore;

said diameter of said bottom region of said bore being greater than said diameter of said top region of said bore;

said top and bottom chambers of said bore each having generally frusto-conical upper and lower sections, said upper sections of said top and bottom chambers each tapering towards said top face of said resiliently compressible element, said lower sections of said top and bottom chambers each tapering towards said bottom face of said resiliently compressible element;

said upper section of said top chamber being positioned adjacent said top region of said bore;

said lower section of said bottom chamber being positioned adjacent said bottom region of said bore;

said upper and lower sections of said top chamber forming an annular upper intersection therebetween;

said upper and lower sections of said bottom chamber forming an annular lower intersection therebetween;

said lower section of said top chamber and said upper section of said bottom chamber forming an annular middle intersection therebetween;

said upper, lower, and middle intersections of said bore lying in substantially parallel planes extending substantially perpendicular to said longitudinal axis of said bore;

said upper, lower, and middle intersections of said bore each having a diameter defined substantially perpendicular to said longitudinal axis of said bore;

said diameter of said upper intersection being greater than said diameter of said lower intersection, said diameter of said lower intersection being greater than said diameter of said middle intersection;

said upper and lower sections of said top and bottom chamber each having a length defined along said longitudinal axis of said bore;

said length of said upper section of said top chamber being defined between said top region of said bore and said lower section of said top chamber;

said length of said lower section of said top chamber being defined between said upper section of said top chamber and said top section of said bottom chamber;

said length of said upper section of said bottom chamber being defined between said lower section of said top chamber and said lower section of said bottom chamber;

said length of said lower section of said bottom chamber being defined between said bottom region of said bore and said upper section of said bottom chamber;

said length of said lower section of said top chamber being greater than said length of said upper section of said top chamber;

said length of said upper section of said bottom chamber being greater than said length of said lower section of said bottom chamber;

said length of said lower section of said bottom chamber being greater than said upper section of said top chamber;

said lengths of said lower section of said top chamber and said upper section of said bottom chamber being about equal to one another;

said length of said upper section of said top chamber being greater than said length of said top region of said bore, said length of said upper section of said top chamber being greater than said length of said bottom region of said bore;

said length of said lower section of said top chamber being greater than said length of said bottom region of said bore;

said upper and lower sections of said top and bottom chambers each having a slope extending at an acute angle with respect to a corresponding plane extending substantially perpendicular to said longitudinal axis of said bore;

said acute angle of said lower section of said top chamber being greater than said acute angle of said upper section of said top chamber;

said acute angle of said upper section of said bottom chamber being greater than said acute angle of said lower section of said bottom chamber;

said acute angle of said upper section of said bottom chamber being greater than said acute angle of said lower section of said top chamber;

said acute angle of said lower section of said bottom chamber being greater than said acute angle of said lower section of said top chamber;

said top and bottom portions of said resiliently compressible element each having a compression resistance for resisting compression against said top and bottom faces of said resiliently compressible element in directions generally parallel to said axis of said resiliently compressible element, said compression resistance of said top portion being less than said compression resistance of said bottom portion, wherein said compression resistance of said bottom portion is between about 10 percent and about 80 percent of said compression resistance of said top portion;

said top face of said resiliently compressible element having a pair of holes therein, said top region of said bore of said resiliently compressible element being interposed between said holes of said top face of said resiliently compressible element; and further comprising a cup with an upper portion, said upper portion of said cup having a pair of studs being inserted into said holes of said top face of said resiliently compressible element.

18. A multi-stage compression spring, comprising:

a resiliently compressible element having top and bottom faces, a side surface, and an axis extending between said top and bottom faces of said resiliently compressible element;

said resiliently compressible element having top and bottom portions;

said resiliently compressible element having a bore extending therethrough between said top and bottom faces of said resiliently compressible element, said bore of said resiliently compressible element having a longitudinal axis;

said bore having top and bottom chambers interposed between said top and bottom faces of said resiliently compressible element;

said top and bottom chambers of said bore each having generally frusto-conical upper and lower sections, said upper sections of said top and bottom chambers each tapering towards said top face of said resiliently compressible element, said lower sections of said top and bottom chambers each tapering towards said bottom face of said resiliently compressible element;

said top and bottom portions of said resiliently compressible element each having a compression resistance for resisting compression against said top and bottom faces of said resiliently compressible element in directions generally parallel to said axis of said resiliently compressible element, said resiliently compressible element being formed of a material having a substantially uniform compression resistance throughout said resiliently compressible element;

wherein said side surface of said top and bottom portions of said resiliently compressible element is substantially cylindrical, a greatest diameter of said top chamber of said bore being greater than a greatest diameter of said bottom chamber of said bore such that said compression resistance of said top portion is less than said compression resistance of said bottom portion.

19. The multi-stage compression spring of claim 18 wherein said upper and lower sections of said top chamber meet at an annular upper intersection, said upper and lower sections of said bottom chamber meet at an annular lower intersection, said upper and lower intersections of said bore each having a diameter defined substantially perpendicular to said longitudinal axis of said bore, and said diameter of said upper intersection is greater than said diameter of said lower intersection.

20. The multi-stage compression spring of claim 19 wherein said lower section of said top chamber and said upper section of said bottom chamber meet at an annular middle intersection having a diameter, and wherein said diameter of said middle intersection is less than said diameter of said upper and lower intersections.

21. A multi-stage compression spring, comprising:

a resiliently compressible element having top and bottom faces, a side surface, and an axis extending between said top and bottom faces of said resiliently compressible element;

said resiliently compressible element having top and bottom portions;

said resiliently compressible element having a bore extending therethrough between said top and bottom faces of said resiliently compressible element, said bore of said resiliently compressible element having a longitudinal axis;

said bore having top and bottom chambers interposed between said top and bottom faces of said resiliently compressible element;

said top and bottom chambers of said bore each having upper and lower sections, said upper sections of said top and bottom chambers each tapering towards said top face of said resiliently compressible element, said lower sections of said top and bottom chambers each tapering towards said bottom face of said resiliently compressible element;

said top and bottom portions of said resiliently compressible element each having a compression resistance for resisting compression against said top and bottom faces of said resiliently compressible element in directions generally parallel to said axis of said resiliently compressible element, said resiliently compressible element being formed of a material having a substantially uniform compression resistance throughout said resiliently compressible element;

said side surface of said top and bottom portions of said resiliently compressible element being substantially cylindrical; and a greatest diameter of said top chamber of said bore being greater than a greatest diameter of said bottom chamber of said bore such that said compression resistance of said top portion is less than said compression resistance of said bottom portion;

said lower section of said top chamber and said upper section of said bottom chamber meeting at an annular middle juncture having a diameter, and wherein said diameter of said middle juncture is less than said greatest diameters of said top and bottom chambers.

* * * * *